United States Patent
Forini et al.

(10) Patent No.: US 8,696,025 B2
(45) Date of Patent: Apr. 15, 2014

(54) STABILIZATION SYSTEM FOR LIFTING VEHICLES

(75) Inventors: Carlo Forini, Umbertide (IT); Maurizio Baldinucci, Gubbio (IT)

(73) Assignee: Terexlift, S.r.l., Zona Industriale Umbertide (PG) (IT)

(*) Notice: Subject to any disclaimer, the term of this patent is extended or adjusted under 35 U.S.C. 154(b) by 288 days.

(21) Appl. No.: 12/736,937

(22) PCT Filed: May 23, 2008

(86) PCT No.: PCT/IT2008/000344
§ 371 (c)(1), (2), (4) Date: Feb. 8, 2011

(87) PCT Pub. No.: WO2009/141840
PCT Pub. Date: Nov. 26, 2009

(65) Prior Publication Data
US 2011/0127757 A1 Jun. 2, 2011

(51) Int. Cl.
*B60S 9/10* (2006.01)
*E02F 9/08* (2006.01)
*B66C 23/80* (2006.01)

(52) U.S. Cl.
CPC . *E02F 9/085* (2013.01); *B60S 9/10* (2013.01); *B66C 23/80* (2013.01)
USPC .................. 280/764.1; 280/763.1; 280/765.1; 280/766.1

(58) Field of Classification Search
CPC .......... B66C 23/80; B66C 23/78; B60S 9/00; B60S 9/02; B60S 9/10; E02F 9/085
USPC ....................... 280/763.1, 764.1, 765.1, 766.1
See application file for complete search history.

(56) References Cited

U.S. PATENT DOCUMENTS

| 3,144,138 | A | * | 8/1964 | Brown et al. | 212/304 |
| 3,721,458 | A | * | 3/1973 | Mitchell | 280/764.1 |
| 3,871,685 | A | * | 3/1975 | Senelet | 280/766.1 |

(Continued)

FOREIGN PATENT DOCUMENTS

| DE | 254931 A | * | 3/1988 |
| GB | 2438970 A | * | 12/2007 |
| WO | WO 9920505 A1 | * | 4/1999 |

*Primary Examiner* — Hau Phan
*Assistant Examiner* — Jacob Meyer
(74) *Attorney, Agent, or Firm* — R. Ruschena Patent Agent, LLC

(57) ABSTRACT

A single movement stabilization system attached to the head of a vehicle and housing at least two stabilizer arms (2) arranged in a symmetric manner with respect to the symmetry plane of the head of a vehicle, perpendicular to the ground surface, and wherein each stabilizer arm (2) comprises an extractable element (3) inside a sliding guide element (15), at whose ends an arm (4) with a support foot (5) is bound with hinge (14), as well as at least one hydraulic cylinder (8) to operate the movement of the arm (4), at least one tie rod element (11) to control the movement of the extractable element (3); and wherein the stabilizer arms (2) are bound with each other along the symmetry plane of the vehicle head; and wherein the hydraulic cylinder (8) and rod element (11) are obliquely positioned with respect to the ground surface in order to utilize the maximum leverage; and wherein the hydraulic cylinders (8) and rod elements (11) are controlled by mechanical lock pins (12) and locking pins (6).

12 Claims, 4 Drawing Sheets

(56) References Cited

U.S. PATENT DOCUMENTS

| | | | |
|---|---|---|---|
| 3,985,036 A * | 10/1976 | Decker et al. | 74/96 |
| 4,111,316 A * | 9/1978 | Wappler | 414/550 |
| 4,118,054 A * | 10/1978 | Vigerie | 280/765.1 |
| 5,383,563 A * | 1/1995 | Richtsfeld et al. | 212/304 |
| 5,387,071 A * | 2/1995 | Pinkston | 414/563 |
| 5,388,949 A * | 2/1995 | Berg | 414/480 |
| 6,089,603 A * | 7/2000 | Ackley | 280/765.1 |
| 6,227,569 B1 * | 5/2001 | Dingeldein et al. | 280/764.1 |
| 6,516,917 B1 * | 2/2003 | Mayer et al. | 182/17 |
| 6,811,161 B1 * | 11/2004 | Anderson | 280/4 |
| 7,150,472 B1 * | 12/2006 | Schneider | 280/766.1 |
| 7,163,207 B2 * | 1/2007 | Baird et al. | 280/6.153 |
| 7,328,810 B1 * | 2/2008 | Rhodes | 212/180 |
| 7,331,607 B1 * | 2/2008 | Schneider | 280/766.1 |
| 2005/0236824 A1 * | 10/2005 | Wissler et al. | 280/765.1 |

\* cited by examiner

STABILIZATION SYSTEM FOR LIFTING VEHICLES

FIELD OF THE INVENTION

The object of the present invention is a vehicle stabilization system, which has an improved lifting capacity and reduced size.

DESCRIPTION OF PRIOR ART

Stabilization systems are known at the state of the art and are normally available on the market; and are usually used for industrial vehicles with rotatable telescopic lifters such as crane trucks, trucks with extendable ladders to be used for rescue purposes in case of fire. The stabilization systems are mounted on self-propelled vehicles characterized by one or more arms for the movement of loads and have the purpose of creating a counterweight in order to avoid the overturning of the vehicle during the movement of the movable arms. For example, a tower crane with mass m is considered, supported on the ground by means of stabilizers placed at a distance from each other equal to "I" and barycentre symmetrically arranged between the stabilizers, when the vehicle is stopped. With the movement of the crane arm, the barycentre varies its position by moving upward, thus increasing the overturning moment, given by the expanded length of the arm multiplied by the force of the hanging load, is greater than the stabilizing moment, computed by the length of the support arm multiplied by "I/2" times the force of the permanent load, the crane is going to overturn. In order to prevent the overturning of the crane, it is sufficient to amplify the distance between the two support arms, or the permanent load, in such a manner that the stabilizing moment is greater than the overturning moment. Permanent load increase is easier in the case of a crane used in building sites, characterized in that once positioned, it remains parked for long periods, usually until the closing of the work site, with respect to a truck with telescopic lifter used for lifting and moving of brief duration. In particular, in the case of trucks with telescopic lifters it is simpler to amplify the distance between the two support arms with articulated mechanical systems.

The stabilization systems are distinguished from one another as operating by a single or double movement of operation. They differentiate also by the way their lifting arms are hinged to their support. In a double movement system, the first movement extends the supports to which the arms are bound by a hinge and the second movement extends the arms down to the ground. In a single movement systems, one movement extends, both the supports to which the arms are bound by a hinge and, at the same time, extends the arms down to the ground for lifting. In particular, the single movement stabilization systems are mounted on vehicles with low load capacity and size. Said systems, while being conceptually simple and economical, ensure a limited length of the stabilizer arm, determined by the distance between the support foot and the longitudinal center line of the head of the machine, with consequent limitation of the useful capacity of the machine. The double movement systems have considerably greater stabilization arm lengths with respect to those of a single movement stabilization, and thus they have decidedly higher stabilization capacities. Said systems are more complex and costlier, and usually are employed on machines with high load capacity where the greater overall costs of the machine justify this choice.

For example, the patent application GB 2438970 discloses a single movement stabilization system comprising an articulated system with a plurality of levers and an actuator for the operation of an hydraulic cylinder.

According to a further example, such as the one described in patent application U.S. 2005/0236824, a particular double movement stabilization system is adapted to be used both on flat ground and on slopes, since it is characterized by height-adjustable support feet.

Numerous other embodiments of stabilization systems for vehicles are commercially available. They achieve their fundamental objective, which is that of stabilizing a load in order to prevent the risk of overturning of the vehicle during operation. Nevertheless, sufficient importance has never been given to the possibility of using a single movement stabilization system for higher loads, such as the one here disclosed. The known single movement stabilization systems are usually used for stabilizing small size vehicles, and are usually inadequate for medium or high size vehicles, for which it is necessary to incur greater production costs, tied to the greater complexity of the double movement stabilization systems.

SUMMARY OF THE INVENTION

One object of the inventive steps of the present invention, is providing a solution to the technical problem of preventing the overturning of medium-capacity vehicles with movable arms, or using a single movement stabilization system having a greater support arm.

The disclosure, object of the present invention, is therefore a single movement stabilization system, with the characteristics set forth in claim 1.

More particularly, this stabilization system, in the preferred embodiment of a single movement stabilization system for rotatable telescopic lifters, is equipped with a greater support arm, due to the oblique position of the actuator means of the arm movement with respect to the symmetry axis of the vehicle's head.

Clearly, the stabilization system is not limited to rotatable telescopic lifters but can be used by any other vehicle having at least one movable arm, this further vehicle consequently are being subject to the same drawbacks. Only as a descriptive example below will reference be made to a stabilization system for rotatable telescopic lifters.

BRIEF DESCRIPTION OF THE DRAWINGS

These and other advantages will be evident from the detailed description of the invention which will make reference to the tables 1/4-4/4, in which several. absolutely non-limiting preferred embodiments of the present invention are represented.

In particular.

DESCRIPTION OF THE PREFERRED EMBODIMENTS

Figure 1:
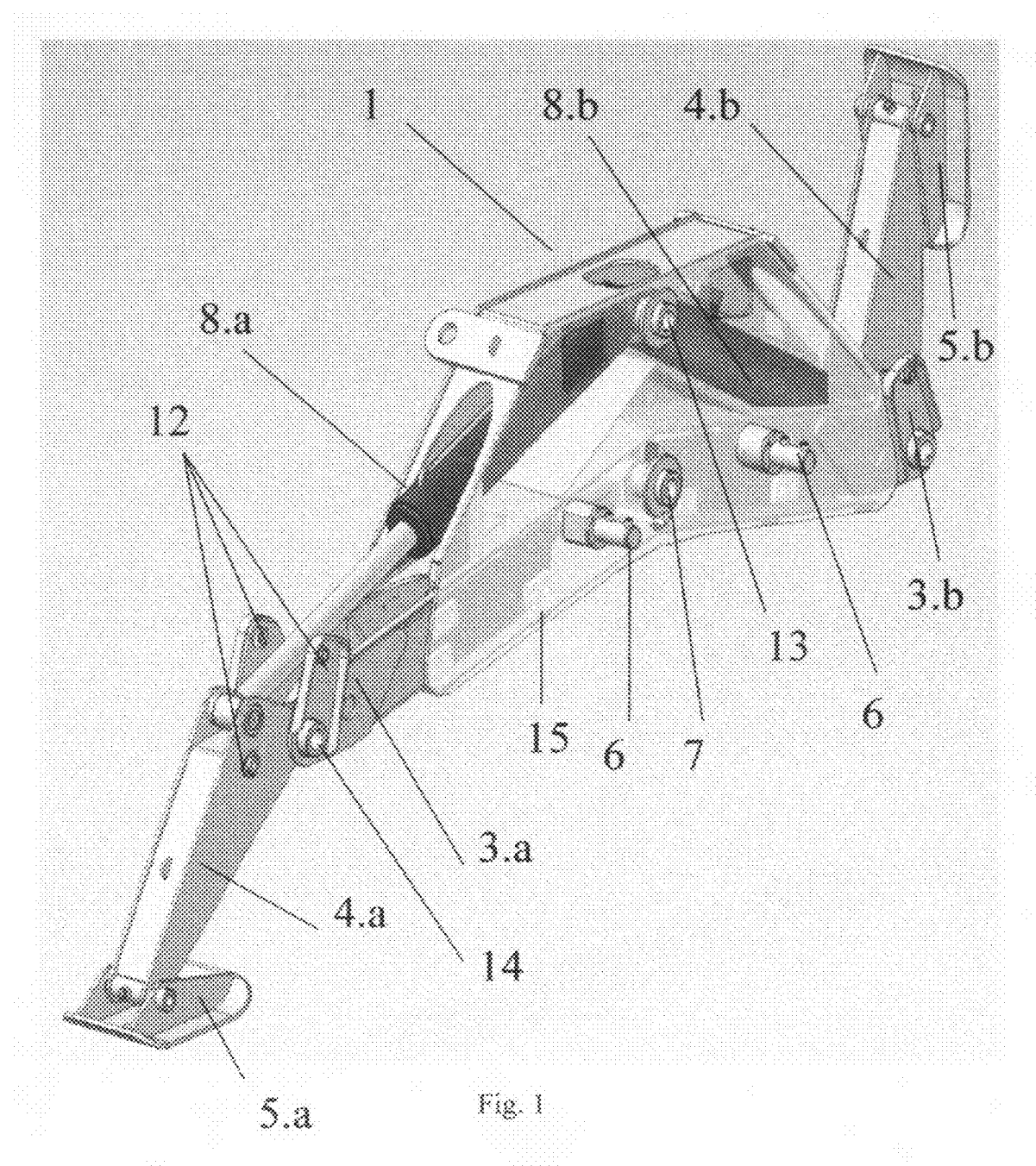
FIG. 1 shows, in perspective view, the stabilization system comprising a stabilizer arm in a closed position and a stabilizer arm in an open position.

With reference to the aforesaid figures, the stabilization system according to the invention is generically indicated with reference number 1. Said stabilization system comprises a head with at least two stabilization arms 2 arranged in a symmetric manner with respect to the symmetry plane of the head of a vehicle, and perpendicular to the ground surface. Each stabilization arm 2 comprises an extractable element 3 sliding inside a guide element 15, at whose end an arm 4 with a support foot 5 is attached by way of an hinge 14, at least one movement actuator means of the arm 4, such as a hydraulic cylinder 8, at least one actuator element of the movement of the extractable element 3, such as a tie rod element 11. Said tie rod element 11 permits the sliding of the extractable element 3 inside the sliding guide 15; moreover, in order to minimize the friction, on the extractable element 3 and on the sliding guide element 15, are mounted a plurality of sliding blocks 10.

Said movement actuator means 8, 11 are controlled by a mechanical lock 12 placed between the arm 4 and the extractable element 3 and by a locking pin 6 of the extractable element in order to execute the operating movements according to predefined sequences.

Said stabilization arms 2 are bound together by means of two pins 7, 13 to the vehicle head, of which the pin 7 connects the ends of the extractable elements and movement actuator means 11 while the pin 13 connects the actuator means of the movement of the arm 4. Said pins 7, 13 are arranged along the symmetry axis of the head of the vehicle, the second in the upper part, while the first is in intermediate position.

Said stabilization system during operation assumes a closed position or an open position. In particular, in the open position, the stabilization arms are designed to lift the load from the ground surface to a desired height. In the closed position, on the other hand, the stabilizer arms are withdrawn into the head of the vehicle and follow the profile of the vehicle itself.

Figure 2:
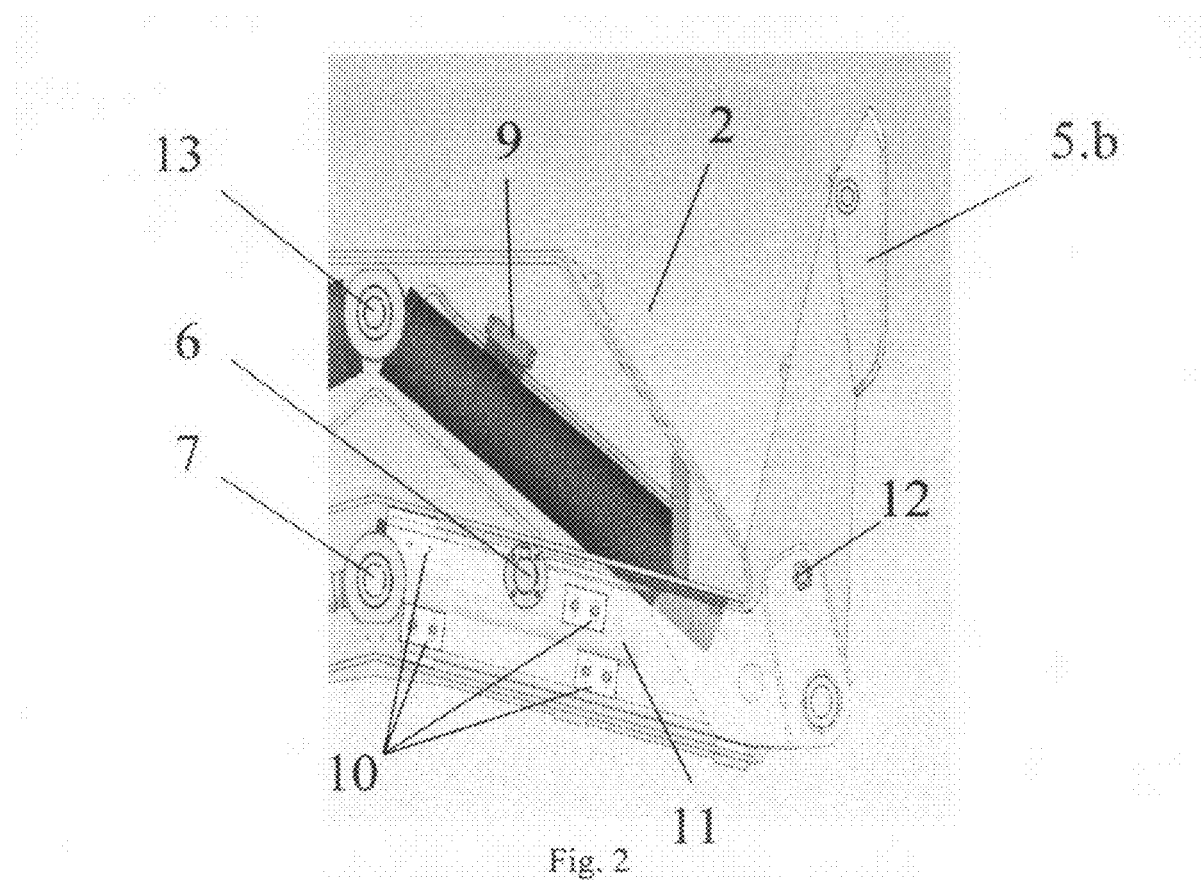
FIG. 2 represents, in axonometric view, a stabilizer arm with the hydraulic cylinder and arm in closed position.
Figure 3:
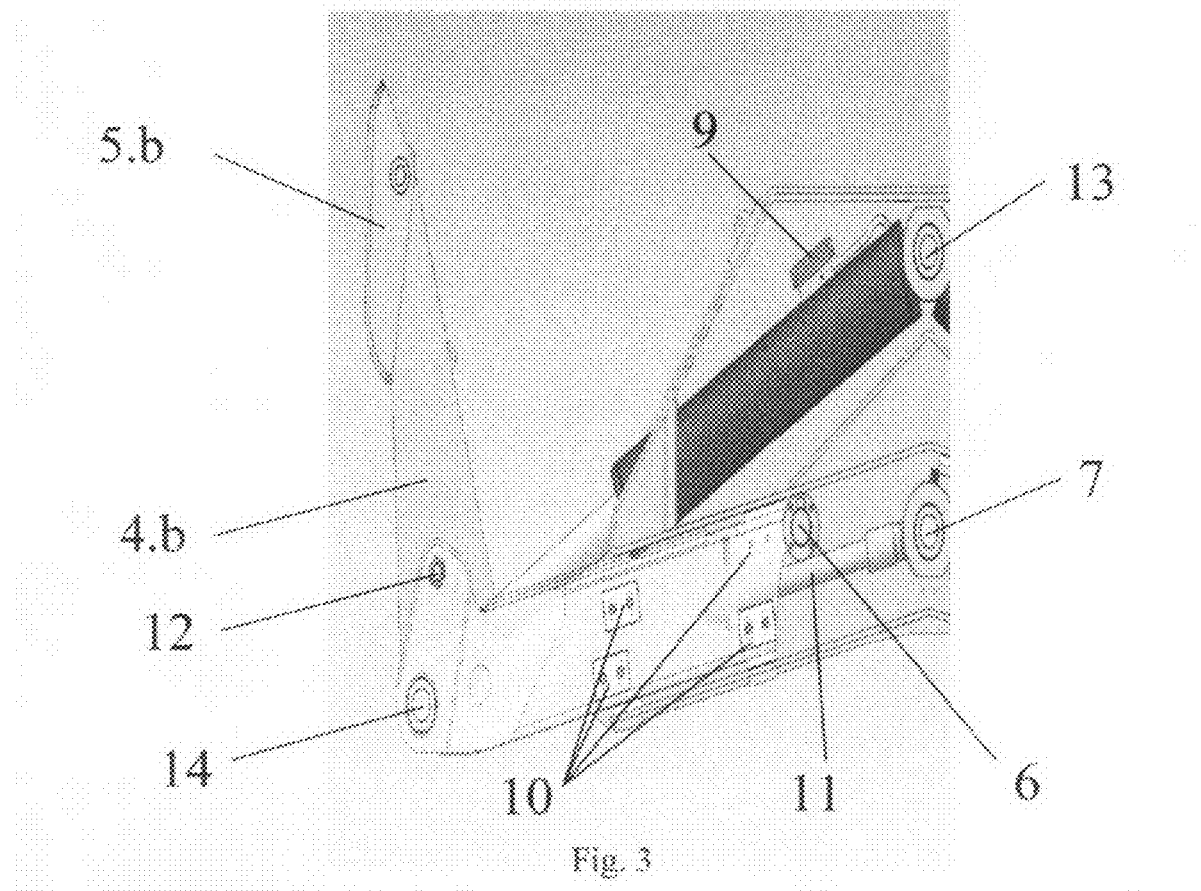
FIG. 3 shows, in axonometric view, showing a stabilizer arm with the hydraulic cylinder in a partially open position and arm in a closed position.

Said stabilizer arms 2 operate simultaneously on opposite sides of the vehicle, in particular when the stabilizer arm 2 is in closed position, the actuator means 8.*b*, 11.*b* are compressed, and the arm 4.*b* and the foot 5.*b* assume a vertical position, as depicted in FIG. 2.

a) Operate the Device from a Closed to an Open Position

Figure 4:
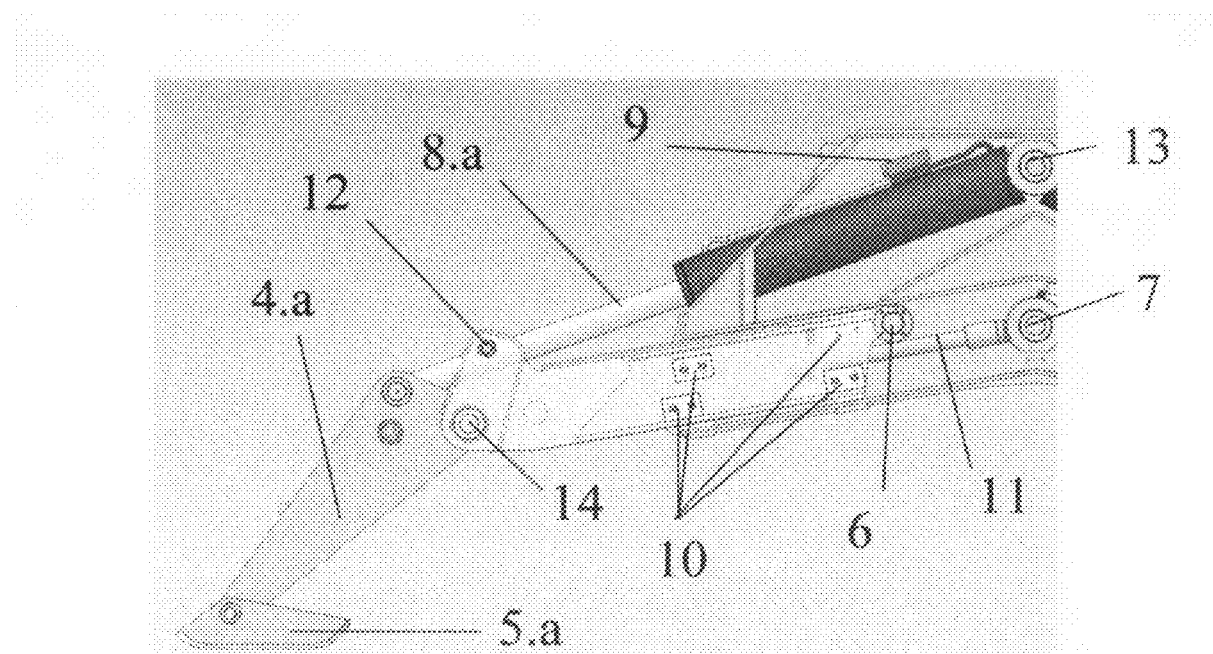
FIG. 4 represents, in axonometric view, a stabilizer arm with the hydraulic cylinder and arm in an open position.
Figure 5:
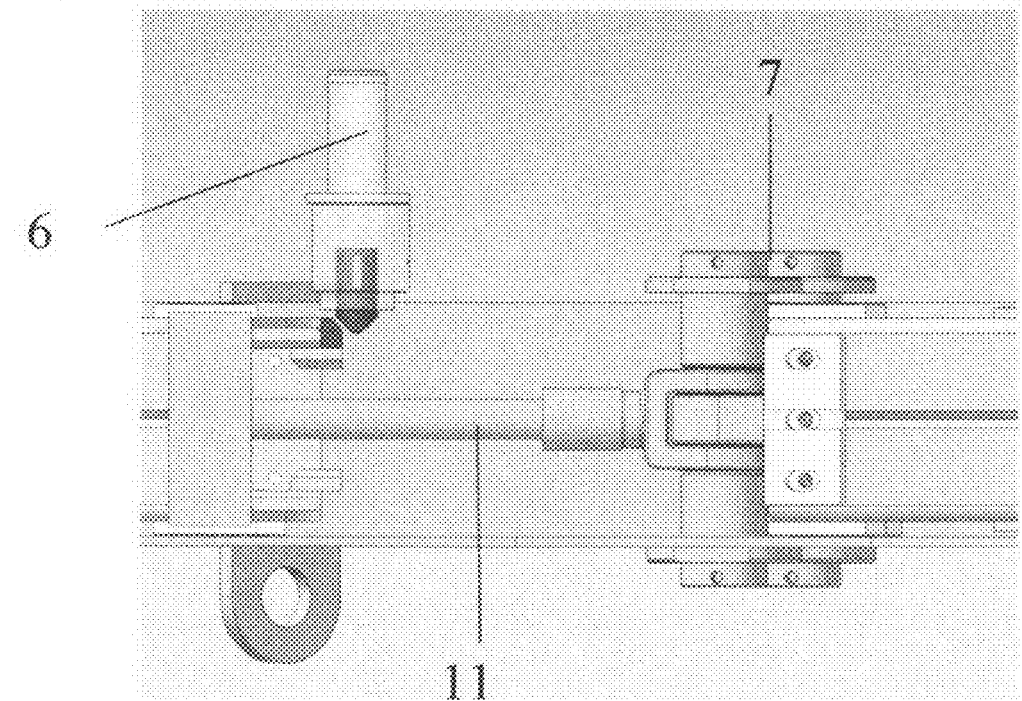
FIG. 5 shows a section of the locking device of the extended extractable element.
Figure 6:
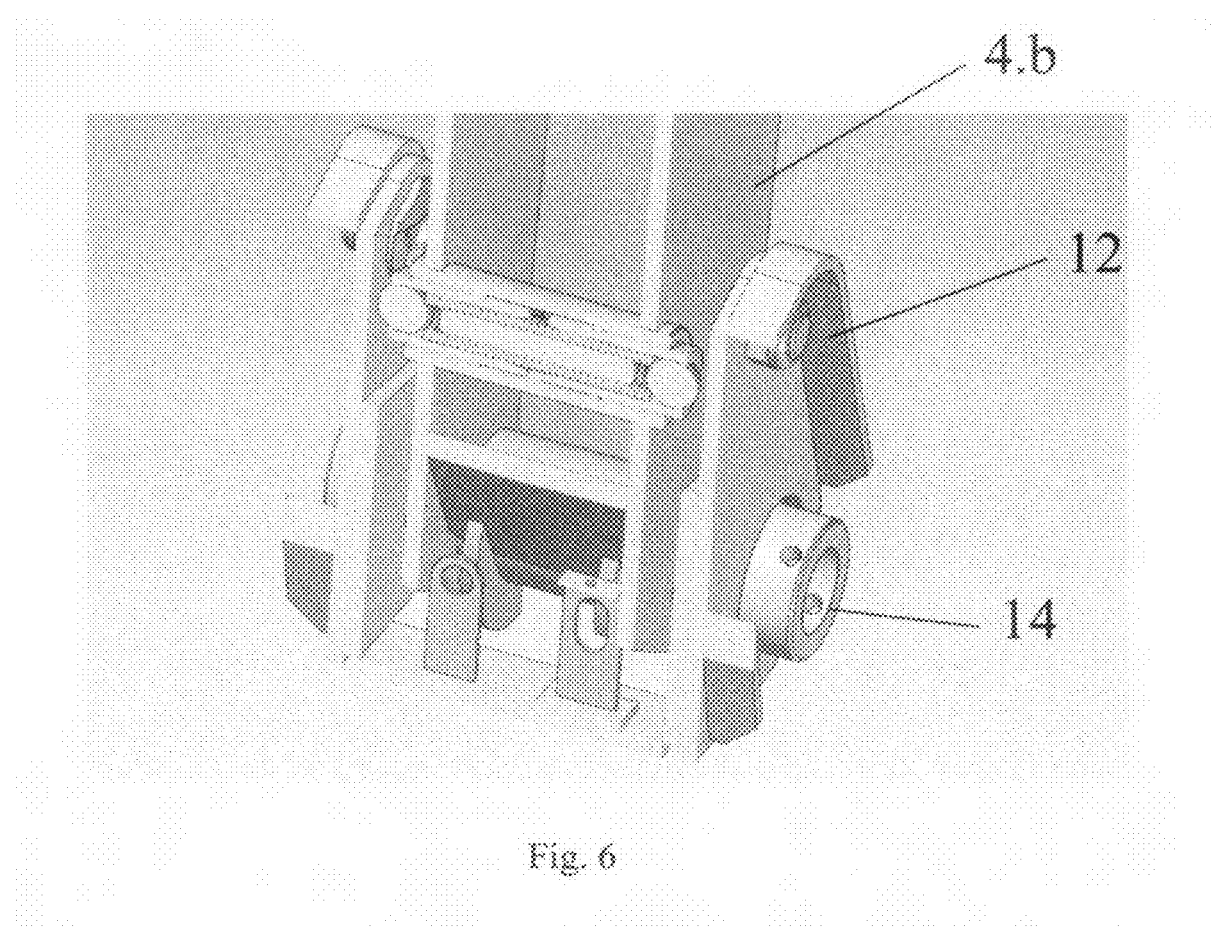
FIG. 6, shows a section of the locking device of the arm in a closed position.

From the open position, the actuator means 8.*a*, 11.*a* are extended, and the arm 4.*a* and the foot 5.*a* assume a horizontal position as shown in FIG. 4.

The functioning principle of said stabilization system is characterized in that from the closed position, the movement actuator means of the arm, such as the hydraulic cylinder 8, is hydraulically extended, and the locking pin 6 is pressurized to extend, thus pushing the lock pin 12 with conical surface against the side of the extractable element 3 which can slide inside the guide 15. During this step, the rotation of the arm 4 towards the bottom is prevented by the mechanical lock 12 placed between the arm and the extractable element 3. When said extractable element 3 is completely extended, i.e. the internal diagphram of the extractable element 3 reaches the external ledge placed on the tie tie rod 11, the lock pin 12, no longer finding the resistance of the side of the extractable element 3, can slide towards the interior of the head and in this manner to ensure the extended locking condition of the extractable element 3 itself.

Once the extended locking condition of the extractable element 3 is attained, the arm 4, having overcome the resistance of the mechanical lock 12 placed between the arm and extractable element, rotates until the foot bound thereto at one end is set on the ground, and with a further extension of the hydraulic cylinder 8, the load is lifted from the ground and locked in an intermediate position with the attainment of the open position, as indicated in FIG. 4.

b) Operate the Device from an Open Position to a Closed Position

In addition, said stabilization system from an open position returns to a closed position when the hydraulic cylinder 8 is commanded to compress until the arm 4 has reached a horizontal position, with inserted lock pin 12 inside the corresponding hole of the arm (4). In particular, the lock pin 12 is inserted inside the hole while the pin 7 is locked by a locking electro-valve, which will be unlocked only when the sensor 9, mounted inside the articulation of the arm 4, recognizes the arm in a vertical position. Once the arm has assumed a vertical position, the sensor 9 causes the opening of the electro-valve of the locking pin 7 of the extractable element 3, causing the lock pin 12 to exiting from the corresponding hole in the arm 4 and thus liberating the extractable element 3, which will now be free to re-enter into its closed position inside the sliding guide element 15.

The stabilization system, object of the present invention, allows the stabilization of greater loads by means of stabilizing arms having greater length than the single movement stabilization systems, since the hydraulic cylinders of the two arms are connected with a pin in the upper part of the head, obtaining a useful and greater stroke of the extractable element 3. In addition to this advantage, there is the simple structure and operation simplicity due to a single control that operates the hydraulic cylinders, as well as lower production costs and material weights. A preferential application is that used in machines with intermediate level of capacity. The mentioned advantages are evident from the results obtained during experimental research on a rotatable telescopic lifter. In fact, this produced an increase in the lateral support length of the stabilizers on the order of 27% with respect to that theoretically obtainable using a simple, single movement stabilizer and with an increase of the open position capacity on the order of 60%. When a double movement stabilization system is compared with a single movement, one has an increase of lateral support length of the stabilizers of 44%. A further advantage of said system is a particular safety expedient of the machine, such that in case of failure of the control sensor of the locking pin 7, because potentially critical situations are not created since the arm remains locked in the vertical position.

What we claim is:

1. A single movement stabilization system to be mounted to one head of a vehicle and comprising at least two stabilizer arms (2) arranged in a symmetric manner with respect to the vertical symmetry plane of the head of a vehicle, wherein each stabilizer arm (2) comprises:

an extractable element (3) sliding inside a guide element (15), at whose end an arm (4), with a support foot (5), is attached by a hinge (14);

a hydraulic cylinder (8) to operate both the movement of the arm (4) and the sliding of the extractable element (3);

at least one tie rod element (11) to limit the movement of the extractable element (3);

a plurality of sliding blocks (10) to facilitate the sliding of the extractable element (3) inside the guide element (15);

locking devices (6, 12) to control and lock said extractable elements (3) and said arms (4) in an open or closed position;

and wherein said hydraulic cylinder (8) and tie rod element (11) are obliquely operating with respect to the ground surface to utilize the maximum leverage to increase lifting power.

2. A single movement stabilization system according to claim 1, wherein said stabilizer arms (2) are bound to each other by means of two pins (7,13), of which the pin (7) is placed in the intermediate part of the head of the vehicle while the pin (13) is placed in an upper position of the head of the vehicle; and wherein said pin (7) includes an electro-valve which locks or unlocks the movement of the extractable element (3).

3. A single movement stabilization system according to claim 2, wherein said pin (7) connects the ends of the tie rods (11) and wherein said pin (13) connects the ends of the hydraulic cylinders (8).

4. A single movement stabilization system according to claim 1, wherein said locking devices comprise:
   a mechanical lock pin (12), to lock the arm (4) in a locked upright position; said lock pin (12) is placed between the arm (4) and the extractable element (3),
   a locking pin (6) controlling the locking and unlocking of the lock pin (12) and the sliding of the extractable element (3); said locking pin (6) is operated by fluid under pressure.

5. A single movement stabilization system according to claim 1, wherein said stabilizer arms (2) operate simultaneously and in unison on opposite sides of the vehicle to which the single movement stabilization system is attached.

6. A single movement stabilization system according to claim 1, wherein said stabilizer arm (2) reaches a closed position, whenever the hydraulic cylinder (8), and the tie rod (11) are compressed, and the arm (4), and the attached foot (5), reaches a vertical position detected by a sensor (9) which causes the pressurized locking pin (6) to the have the locking pin (12) to lock the arm (4) in a vertical position and causes the opening of the electro-valve of pin (7) which allows the extractable element (3) to re-enter in a closed position guided by the sliding guide (15).

7. A single movement stabilization system according to claim 1, wherein said stabilizer arm (2) reaches an open position, when the pressurized locking pin (6) causes the locking pin (12) to unlock the arm (4) from a vertical position; while the hydraulic cylinder (8) and the tie rod (11) are extended, and the arm (4), and the attached foot (5), reaches a horizontal position which is detected by a sensor (9) to cause the unlocking of the electro-valve of pin (7) to allows the sliding out of the extractable element (3) guided by the sliding guide (15).

8. A single movement stabilization system according to claim 1, wherein inside said arm (4), is mounted a sensor (9) to detect the position of the arm (4) in a vertical or horizontal position.

9. A single movement stabilization system according to claim 1, wherein said tie rod element (11) allows the controlled sliding of the extractable element (3) inside or outside the sliding guide (15).

10. A single movement stabilization system according to claim 1, wherein said plurality of sliding blocks (10) are attached to both extractable elements (3.) and on said sliding guides (15), to minimize the friction during the sliding movement of the extractable element (3).

11. A single movement stabilization system according to claim 1, characterized by the following operating steps to deploy it into an open, operating position:
   from the closed position, the hydraulic cylinder (8), is commanded to be hydraulically extended;
   the locking pin (6) is pressurized to extend, thus pushing the mechanical lock pin (12) against the side of the extractable element (3);
   the extractable element (3), can slide outside, guided by the sliding guide (15), while the downward rotation of the arm (4) is still prevented by the mechanical lock pin (12) placed between the arm (4) and the extractable element (3);
   the extractable element (3) is completely extended, the mechanical lock pin (12) slides towards the interior of the head to lock the extractable element (3) in an extended locked condition;
   from the extended locked condition of the extractable element (3), the arm (4), having overcome the resistance of the mechanical lock pin (12), rotates until the support foot (5) which is attached by the hinge (14), touches the ground;
   with a further extension of the hydraulic cylinder (8), the load is lifted from the ground with the attainment of the operating position.

12. A single movement stabilization system according to claim 1, characterized by the following operating steps to deploy it into a closed, non-operating position:
   from an open, operating position, a closed position is attained whenever the hydraulic cylinder (8) is commanded to compress until the arm (4) assumes a vertical position with the mechanical lock pin (12) inserted into a corresponding hole on the side of the arm (4);
   a sensor (9) detects the vertical position of the arm (4), and cause the unlocking of the electro-valve of pin (7) related to the extractable element (3);
   the extractable element (3) is now free to re-enter inside the sliding guide (15) to the closed position.

* * * * *